United States Patent
Kumar et al.

(10) Patent No.: US 12,045,462 B2
(45) Date of Patent: Jul. 23, 2024

(54) SYSTEM AND METHOD TO CREATE APPLICATION COPIES FOR COPY REUSE UTILIZING THE APPLICATION BACKUP DATA STORED IN SECONDARY STORAGE

(71) Applicant: Dell Products L.P., Round Rock, TX (US)

(72) Inventors: Sunil Kumar, Bangalore (IN); Ravi Vijayakumar Chitloor, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 141 days.

(21) Appl. No.: 17/931,628

(22) Filed: Sep. 13, 2022

(65) Prior Publication Data

US 2024/0086066 A1  Mar. 14, 2024

(51) Int. Cl.
  *G06F 3/06* (2006.01)
  *G06F 11/20* (2006.01)

(52) U.S. Cl.
  CPC .......... *G06F 3/0607* (2013.01); *G06F 3/0635* (2013.01); *G06F 3/067* (2013.01); *G06F 11/2069* (2013.01)

(58) Field of Classification Search
  CPC ...... G06F 3/0607; G06F 3/0635; G06F 3/067; G06F 11/2069
  See application file for complete search history.

(56) References Cited

U.S. PATENT DOCUMENTS

| | | | |
|---|---|---|---|
| 2010/0082765 A1* | 4/2010 | Murase | G06F 3/0665 709/213 |
| 2010/0122248 A1* | 5/2010 | Robinson | G06F 9/485 718/1 |
| 2011/0178988 A1* | 7/2011 | Satoyama | G06F 3/0608 707/649 |
| 2016/0092535 A1* | 3/2016 | Kuchibhotla | G06F 3/04842 707/634 |
| 2019/0129626 A1* | 5/2019 | Armangau | G06F 3/0619 |
| 2019/0278521 A1* | 9/2019 | Matsugami | G06F 3/061 |
| 2021/0191658 A1* | 6/2021 | Mizushima | G06F 3/0688 |

* cited by examiner

*Primary Examiner* — Jason W Blust
(74) *Attorney, Agent, or Firm* — Workman Nydegger

(57) ABSTRACT

One example method includes copying selected backup data from a secondary storage system to a provisioned primary storage volume, creating a snapshot of the primary storage volume, using the snapshot to create a thin clone volume, masking the thin clone volume, and mounting the thin clone volume, and recovering the backup data from the thin clone volume. The recovered backup data may be made available to a secondary workload that includes an enterprise application.

20 Claims, 3 Drawing Sheets

SYSTEM AND METHOD TO CREATE APPLICATION COPIES FOR COPY REUSE UTILIZING THE APPLICATION BACKUP DATA STORED IN SECONDARY STORAGE

FIELD OF THE INVENTION

Embodiments of the present invention generally relate to backup data. More particularly, at least some embodiments of the invention relate to systems, hardware, software, computer-readable media, and methods, for the use of backup data to create application copies for copy reuse.

BACKGROUND

Backup applications are core part of an enterprise infrastructure, and every enterprise deploys some or other mechanism to backup critical applications running in their environment. These backups are usually performed on a recurring basis depending on the enterprise risk and recovery requirements. Irrespective of the backup schedule, almost all enterprises end up incurring significant financial expense on infrastructure for performing data backups, even though the infrastructure primarily just acts as a form of insurance that can be utilized when the primary data is corrupted or unavailable for some reason.

On other hand, there are many secondary applications which may require access to primary data to meet their data requirements. Some of these applications include Test/Dev, Analytics, Reporting, and Forensic, use cases. The data needs of such applications may be adequately serviced without giving the applications access to primary data, which might impact production data workloads, if the backup data is made available to the applications in native format on a storage which meets the IOPs SLA specified for the application.

Many secondary data storage systems, such as Dell DataDomain for example, offer a way to extract the backup data in native format and make that data available on a shared storage which can be accessed by other application. However, these approaches very limited in terms of the applications IOPs they are able to support, although they may be good for certain use cases like validating data integrity, and in most cases are not a viable solution to meet the data needs, and SLA requirements, of these applications.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
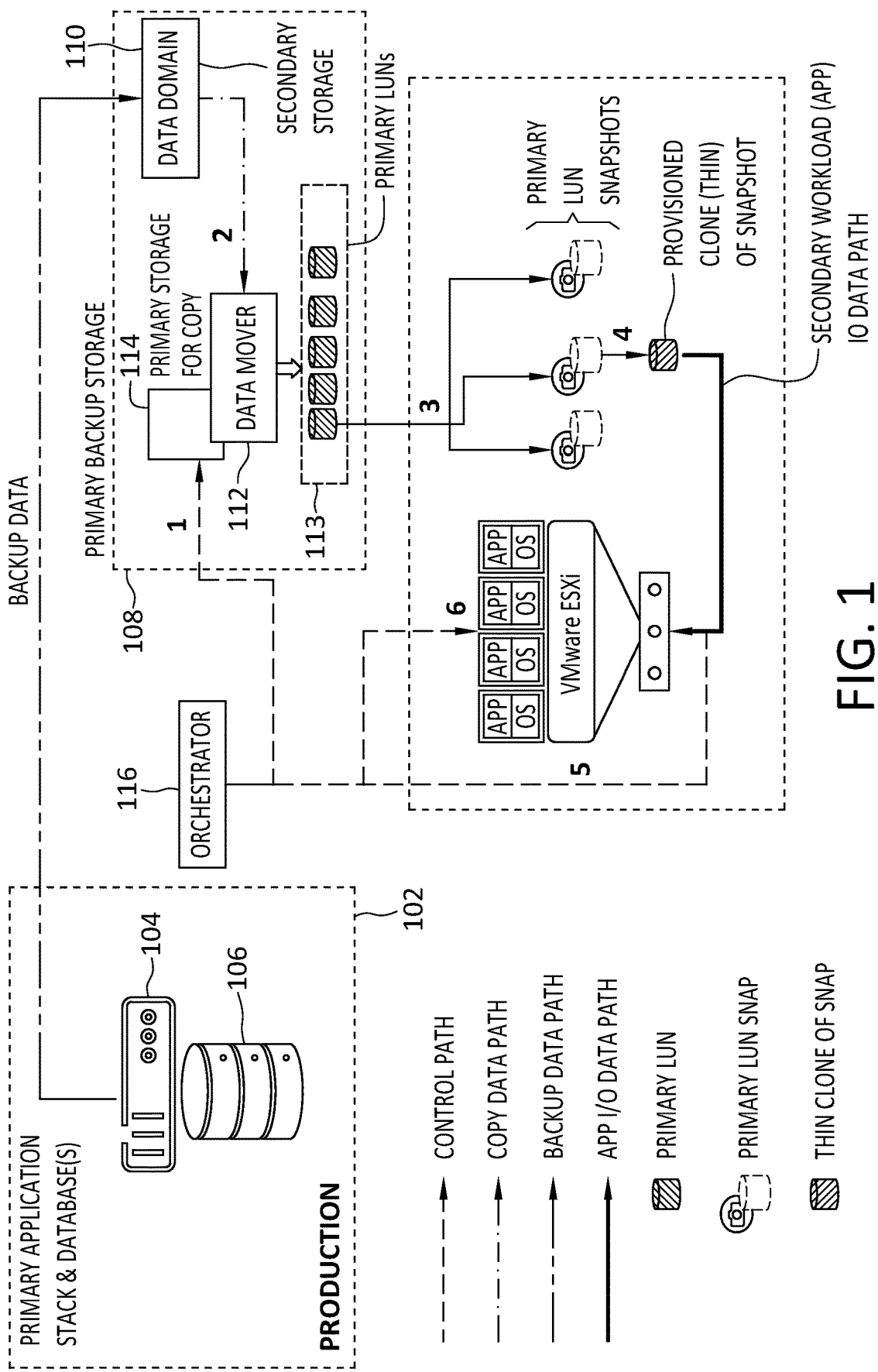
FIG. 1 discloses aspects of an architecture and orchestration method according to some embodiments.

Embodiments of the present invention generally relate to backup data. More particularly, at least some embodiments of the invention relate to systems, hardware, software, computer-readable media, and methods, for the use of backup data to create copies of data, such as application copies, for copy reuse. Thus, where reference is made herein to 'data' such data includes, but is not limited to, applications, and data generated by applications, and data generated in other ways.

In general, some example embodiments of the invention are directed to a system and method which may be used to create application copies which reside on a primary storage system. These application copies may be created from the backup data stored on secondary storage system, and may be adequate to meet the needs of one or more applications, such as an application IOPs (Input/Output Operations) SLA requirement for example.

In one example embodiment, an orchestrator may perform and/or direct a method that includes taking backup copies and making those copies available on primary storage for copy reuse functionality. However, it is not required that the orchestrator take the backup copies. For example, other backup software and/or backup platforms may take the backup copies. In any case, high performance copies are available, for use by applications, on primary instead of secondary storage. After the first full rehydration of the backup copies, the method may leverage secondary storage differentials to bring the differences back to the primary. In this way, the data to be used by the applications may be updated quickly and efficiently as changes occur to the backup data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, some embodiments may enable applications to access and use high performance copies of backup data that may be adequate to meet the needs of the applications and/or to meet requirements such as SLAs. Some embodiments may enable the creation and use of high performance copies of backup data without impairing the creation, backup, and use, of production data. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. General Aspects of Example Operating Environments

The following is a discussion of general aspects of some example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM).

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Aspects of an Example Architecture/Operating Environment

With reference now to FIG. 1, one example of an operating environment for embodiments of the invention is denoted generally at 100. In general, the operating environment 100 may comprise a production site 102 that may comprise a primary application stack 104 and supporting databases 106. The applications in the application stack 104 may, during normal enterprise operations, generate data that may be stored in the databases 106.

From time to time, the data stored in the databases 106 may be backed up to a primary backup storage site 108 that may comprise a secondary storage platform 110, such as Dell DataDomain for example. The primary backup storage site 108 may also comprise a data mover 112 that may communicate with the secondary storage platform 110 which may transmit backed up data to the data mover 112, as discussed in more detail below. In general however, the copies transmitted by the secondary storage platform 110 to the data mover 112 may be stored in a primary copy storage 114 that is accessible by enterprise applications and processes such as, but not limited to, Test/Dev, Analytics, Reporting, and Forensics. Note that such 'enterprise applications' are distinct from the applications included in the application stack 104 and which generated new/modified data that is backed up at the primary backup storage site 108. Finally, an orchestrator 116, which may be hosted at any suitable site, may coordinate the operations for the creation of copies of backed up data, and for making those copies available to enterprise applications and processes by way of the primary copy storage 114.

With continued reference to FIG. 1, further details are provided concerning the operations and components disclosed there. For example, the secondary storage platform may comprise backup software for backing up data received from the production site 102. Data in the primary copy storage 114 may be used to run secondary workloads, or enterprise applications, such as Test/Dev, Analytics, Reporting, and Forensics. The data mover 112 may operate to copy data from secondary storage platform 110 to one or more LUNs 113 included in a primary storage and, ultimately, to the primary copy storage 114. Finally, the orchestrator, which may take the form of the DellEMC AppSync for example, may operate to manage continuous data draining from the secondary storage 110 to the primary copy storage 114 so that enterprise applications have ongoing access to the data, and to changes to the data.

C. Aspects of Some Example Operations

By way of overview, some embodiments may operate to take backup copies and those available on primary storage for copy reuse functionality by enterprise applications and/or other users. Embodiments may be able to surface high performance copies on primary copy storage instead of secondary storage of a data backup site. Embodiments may reduce the impact, such as in terms of IOs, on production data stored at a primary backup storage site since the high performance copies may be created from backups. After the first full rehydration, that is, creation of the high performance copies, embodiments may leverage secondary storage differentials, that is, differences between the production data and the backed up data, to bring the differences from a secondary storage platform back to the primary copy storage, which may be efficient in terms of operations performed, and bandwidth consumed. Thus, some embodiments are directed to copy reuse workflows. Further, embodiments may periodically refresh the primary copy, that is, the copy stored in primary copy storage 114, as required for copy reuse and to help ensure that the primary copy, or primary copies, are up to date. Finally, embodiments may operate to selectively mask data on the primary copy as required for copy reuse by enterprise applications or other users who are not permitted to access that data. That is, the masking may prevent unauthorized users from accessing certain data of the primary copy.

Figure 2:
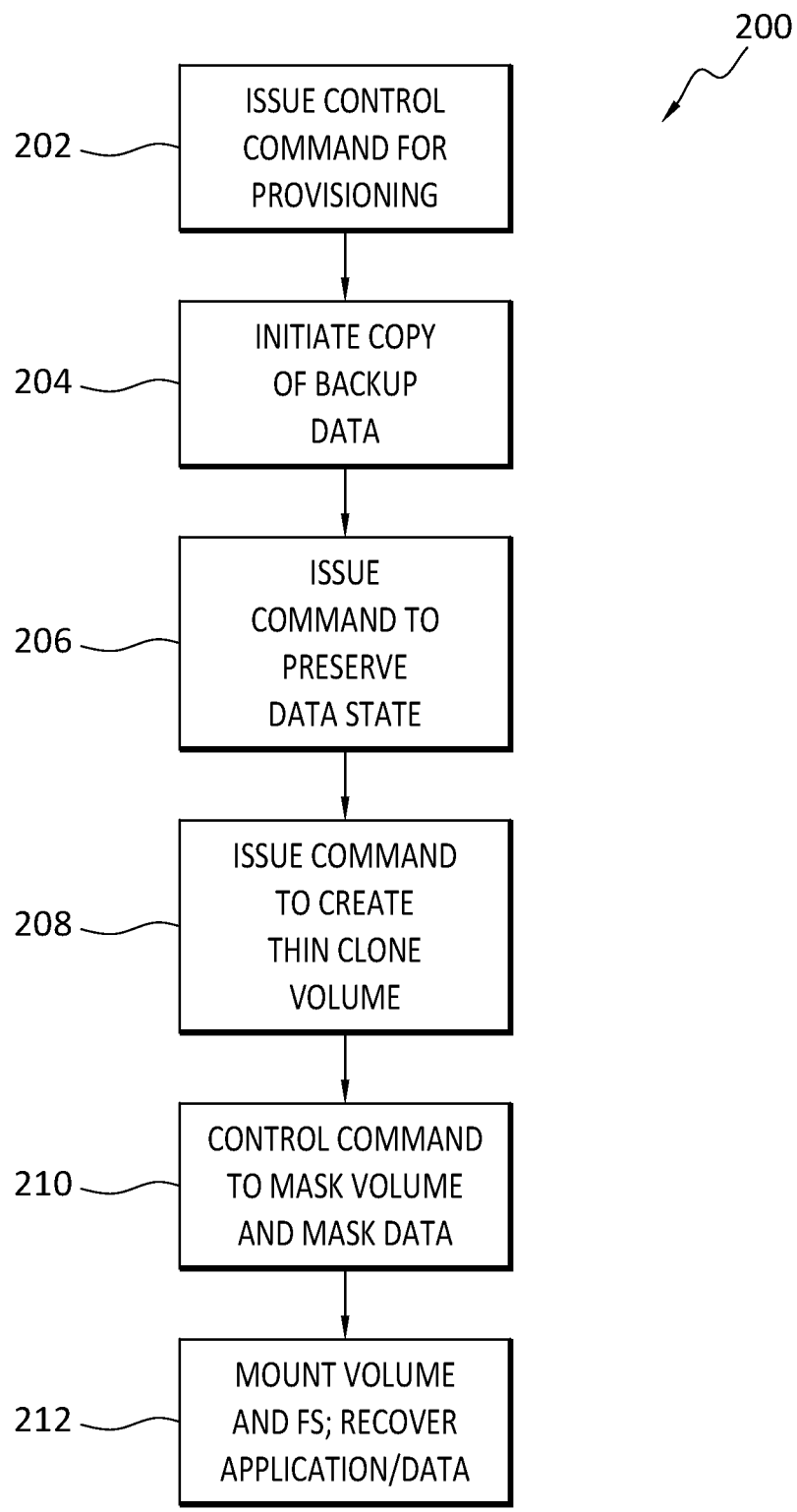
FIG. 2 discloses aspects of a method according to some embodiments.

With continued attention to FIG. 1, and directing attention now to FIG. 2 as well, details are provided concerning an example method 200 according to some embodiments, and which may be performed in whole or in part within an enterprise data protection system. Some or all of the method 200 may be performed by an orchestrator, such as the orchestrator 116 disclosed in FIG. 1. However, the scope of the invention is not limited to the use of an orchestrator, nor to the performance of the disclosed operations by an orchestrator. In general, the method 200 may operate to generate the copies, for copy reuse by enterprise applications and other users, from the backup data stored in a secondary storage platform. In some embodiments, the method may include creating a primary backup storage system to provision a primary storage volume, while in other embodiments, a provisioned primary storage volume may already exist.

The method 200 may begin when an orchestrator issues a ctrl command 202 (see 1 in FIG. 1) to a primary backup storage site to provision a LUN (Logical Unit Number), that designates physical and/or virtual data storage devices, for the storage of copies. Generally, the LUN sizes may be the same as the corresponding production volume size.

Next, the orchestrator may issue a command 204 (see 2 in FIG. 1) to a data mover to initiate a copy of specific backup data, depending on the point-in-time selected for copy, from a secondary storage platform to the primary storage system volume provisioned at 202. In more detail, the orchestrator may perform a full copy of the backup data in a volume in case a previous copy operation has not been performed for that volume of interest. While this full copy process may be relatively time consuming, embodiments may provide that this process need only be performed once per volume.

In the event that the backup data has already been copied, the orchestrator may ask the backup software to only send the diff, that is, the differentials, of the data from the previous copy and the new point-in-time copy desired. This approach may be significantly less time consuming, as compared with performing a full copy, as only the modified data, that is, any differences between the two copies, is copied.

In situations where a backup of application transaction/archive logs is also captured by the backup software, the orchestrator may also copy new logs, or differences between the previously copied logs and the logs associated with the data as the data existed at a subsequent point-in-time. If an application in an application stack is capable of very fine-grained recovery by applying these logs, the orchestrator may make use of these logs to recover the application data to the nearest point-in-time copy desired.

With continued reference now to FIG. 2, the orchestrator may issue a control command 206 (see 3 in FIG. 1) to the primary backup storage site to preserve the state of data copied to the primary storage volume, which may include the primary LUNs, corresponding to a particular point-in-time desired, by creating an array snapshot of the primary storage volume. This preservation may comprise the creation of one or more primary LUN snapshots, each corresponding to a respective primary LUN.

After the data preservation process has been performed, the orchestrator may then issue a control command 208 (see 4 in FIG. 1) to the primary backup storage site to create a thin clone volume from the snapshot created at 206 above. This thin clone volume may comprise a read write point-in-time copy of the data and may be suitable to run a secondary workload associated with an enterprise application, for example. The thin clone volume may be adequate to meet all the IOPs SLA, and/or other requirements/constraints, required by the secondary workload.

At 210 (see 5 in FIG. 1), the orchestrator may issue a control command to the primary backup storage site to mask the thin clone volume to host/hypervisor/cluster, when the secondary workload is required to access the data. This masking may comprise, for example, leaving the data unmasked in the thin clone volume, and then masking the data when it is requested by an enterprise application. The masked data, which is inaccessible to unauthorized users, may then be transmitted from the thin clone volume to the enterprise application.

Finally, the orchestrator may issue a control command 212 (see 6 in FIG. 1) to host/hypervisor to rescan a SCSI bus and mount the volume and filesystem from the masked volume. The orchestrator may then issue a control command to the application instance on the host/VM to recover the application from the mounted filesystem.

As will be apparent from this disclosure, including the discussion of FIGS. 1 and 2, backup data for any workload stored in any secondary storage, may be efficiently reused to create data copies usable by the secondary workloads. The data copies may be in native format, that is, the same format as the data as generated by/in the production application, and may be stored in a storage so that the data/storage are adequate to meet the needs, such as SLA requirements for example, of secondary workloads.

D. Example Methods

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: performing operations including: creating a primary backup storage system to provision a primary storage volume; copying selected backup data from a secondary storage system to the primary storage volume; creating a snapshot of the primary storage volume; using the snapshot to create a thin clone volume; masking the thin clone volume; and mounting the thin clone volume, and recovering the backup data from the thin clone volume.

Embodiment 2. The method as recited in embodiment 1, wherein the backup data comprises an application and/or data.

Embodiment 3. The method as recited in any of embodiments 1-2, wherein the thin clone volume comprises a read/write point-in-time copy of the backup data.

Embodiment 4. The method as recited in any of embodiments 1-3, wherein one or more of the operations are performed as directed by an orchestrator.

Embodiment 5. The method as recited in any of embodiments 1-4, wherein the thin clone volume is capable of meeting an IOPs requirement of a service level agreement associated with a secondary workload.

Embodiment 6. The method as recited in any of embodiments 1-5, wherein a full copy of the backup data is created when a full copy of the backup data does not already exist.

Embodiment 7. The method as recited in any of embodiments 1-6, wherein the selected backup data is copied by a data mover hosted at the primary backup storage system and operable to communicate with the primary storage volume and with the secondary storage system.

Embodiment 8. The method as recited in any of embodiments 1-7, wherein the recovered backup data is made available to a secondary workload that comprises an enterprise application.

Embodiment 9. The method as recited in any of embodiments 1-8, wherein performance of the operations is directed by a single orchestrator.

Embodiment 10. The method as recited in any of embodiments 1-9, wherein the backed up data is refreshed with changes made to data from which the backed up data was taken.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
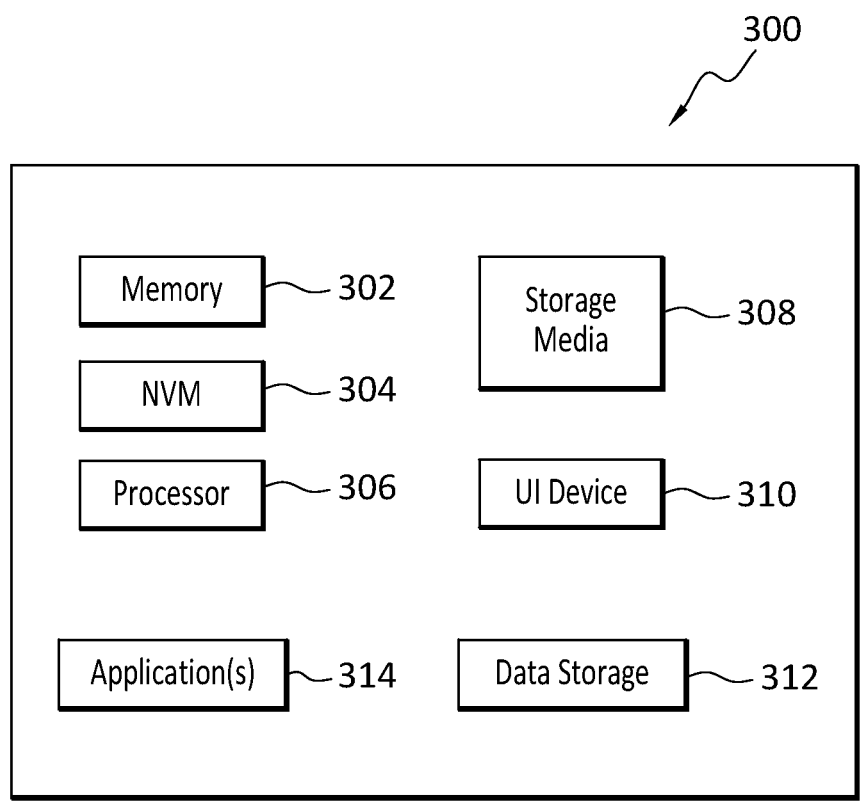
FIG. 3 discloses aspects of an example computing device operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
performing operations including:
copying selected backup data from a secondary storage system to a provisioned primary storage volume;
creating a snapshot of the primary storage volume;
using the snapshot to create a thin clone volume;
masking the thin clone volume; and
mounting the thin clone volume, and recovering the backup data from the thin clone volume.

2. The method as recited in claim 1, wherein the backup data comprises an application and/or data.

3. The method as recited in claim 1, wherein the thin clone volume comprises a read/write point-in-time copy of the backup data.

4. The method as recited in claim 1, wherein one or more of the operations are performed as directed by an orchestrator.

5. The method as recited in claim 1, wherein the thin clone volume is capable of meeting an IOPs requirement of a service level agreement associated with a secondary workload.

6. The method as recited in claim 1, wherein a full copy of the backup data is created when a full copy of the backup data does not already exist.

7. The method as recited in claim 1, wherein the selected backup data is copied by a data mover hosted at the primary backup storage system and operable to communicate with the primary storage volume and with the secondary storage system.

8. The method as recited in claim 1, wherein the recovered backup data is made available to a secondary workload that comprises an enterprise application.

9. The method as recited in claim 1, wherein performance of the operations is directed by a single orchestrator.

10. The method as recited in claim 1, wherein the backed up data is refreshed with changes made to data from which the backed up data was taken.

11. A non-transitory storage medium having stored therein instructions that are executable by one or more hardware processors to perform operations comprising:
copying selected backup data from a secondary storage system to a provisioned primary storage volume;
creating a snapshot of the primary storage volume;
using the snapshot to create a thin clone volume;
masking the thin clone volume; and
mounting the thin clone volume, and recovering the backup data from the thin clone volume.

12. The non-transitory storage medium as recited in claim 11, wherein the backup data comprises an application and/or data.

13. The non-transitory storage medium as recited in claim 11, wherein the thin clone volume comprises a read/write point-in-time copy of the backup data.

14. The non-transitory storage medium as recited in claim 11, wherein one or more of the operations are performed as directed by an orchestrator.

15. The non-transitory storage medium as recited in claim 11, wherein the thin clone volume is capable of meeting an IOPs requirement of a service level agreement associated with a secondary workload.

16. The non-transitory storage medium as recited in claim 11, wherein a full copy of the backup data is created when a full copy of the backup data does not already exist.

17. The non-transitory storage medium as recited in claim 11, wherein the selected backup data is copied by a data mover hosted at the primary backup storage system and operable to communicate with the primary storage volume and with the secondary storage system.

18. The non-transitory storage medium as recited in claim 11, wherein the recovered backup data is made available to a secondary workload that comprises an enterprise application.

19. The non-transitory storage medium as recited in claim 11, wherein performance of the operations is directed by a single orchestrator.

20. The non-transitory storage medium as recited in claim 11, wherein the backed up data is refreshed with changes made to data from which the backed up data was taken.

* * * * *